Patented Oct. 3, 1933

1,929,014

UNITED STATES PATENT OFFICE 1,929,014

RECOVERY OF METALLIC OXIDES FROM ORES

Harry C. Claflin, Cleveland, Ohio, assignor to Beryllium Development Corporation, New York, N. Y., a corporation of Delaware No Drawing. Application September 17, 1930
Serial No. 485,325

21 Claims. (Cl. 23—16)

This invention relates to a method for the recovery of metallic oxides from ores, particularly silicate ores, and is especially useful in the recovery of beryllium oxide.

One of the primary objects of the invention is to improve existing procedure to make it more effective and less expensive and to secure a superior grade of by-product.

The nature of the invention will be understood from the following.

It has long been known that natural silicates can readily be decomposed to give products more easily attacked chemically than the refractory ores themselves, by interacting the ore with an alkaline or alkaline earth silico-fluoride at elevated temperatures. The reaction is believed to follow the type formula:

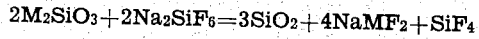

$$2M_2SiO_3 + 2Na_2SiF_6 = 3SiO_2 + 4NaMF_2 + SiF_4$$

The silicon fluoride indicated in the reaction is given off and lost, generally by interaction in the air, to yield more silica and hydrogen fluoride.

This method has been used with effect in the separation of the beryllium content of silicates such as phenacite and beryl. In the case of beryl, using sodium silico-fluoride as the reacting material, a corollary advantage results from the fact that the aluminum present in beryl is converted to the water-insoluble double fluoride, cryolite, while the analagous sodium beryllium fluoride is quite soluble in water. In one major step, therefore, it becomes feasible to separate beryllium from both silicon and aluminum.

Since, for most purposes, the double fluorides are not required as such, they are generally decomposed by alkali action, yielding the corresponding hydrated oxides as a precipitate and the alkali fluoride in solution. Hitherto the by-product alkali fluoride has had relatively low value, its recovery by evaporation resulting in a material physically not of the best commercial form.

By a radical change, I have not only been able to find a direct outlet for a good portion of this resulting fluoride, but, more important, have been able to cut down the silico-fluoride needed in the primary step very considerably—to almost sixty percent of what would otherwise be required. I shall use beryllium as an example, but it should be understood that this is typical of others.

By the method hitherto standard, using only beryl ore and sodium silico-fluoride, the commercially optimum ratio has been that of equal parts of the two materials. In my invention, I reduce the silico-fluoride sharply and substitute for part of it a smaller quantity of sodium fluoride, preferably obtained from a previous operation.

By this means there is little or no loss of silicon-fluoride and an equally high yield of sodium beryllium fluoride results as would occur otherwise only by the use of the full quota of silico-fluoride.

As a specific example, optimum operation hitherto has called for thirty parts of beryl and thirty of sodium silico-fluoride. By my process, the thirty parts of beryl are retained, of course, but the sodium silico-fluoride is decreased to nineteen parts, and four parts of sodium fluoride are added to the mixture instead. Treatment than continues as normally. The sodium fluoride used can be obtained readily as the product of the reaction of the resulting sodium beryllium fluoride with sodium hydroxide.

I claim:—

1. The process of separating a metallic oxide from its ore which comprises reacting the ore with a silico-fluoride and a fluoride.

2. The process of separating a metallic oxide from its ore which comprises reacting the ore with an alkaline silico-fluoride and a fluoride.

3. The process of separating a metallic oxide from its ore which comprises reacting the ore with an alkaline silico-fluoride and an alkaline fluoride.

4. The process of separating a metallic oxide from its ore which comprises reacting a silicate with a silico-fluoride and a fluoride.

5. The process of separating a metallic oxide from its ore which comprises reacting a silicate with an alkaline silico-fluoride and a fluoride.

6. The process of separating a metallic oxide from its ore which comprises reacting a silicate with an alkaline silico-fluoride and an alkaline fluoride.

7. The process of separating a metallic oxide from its ore which comprises reacting a beryllium-containing silicate with a silico-fluoride and a fluoride.

8. The process of separating a metallic oxide from its ore which comprises reacting a beryllium-containing silicate with an alkaline silico-fluoride and a fluoride.

9. The process of separating a metallic oxide from its ore which comprises reacting a beryllium-containing silicate with an alkaline silico-fluoride and an alkaline fluoride.

10. A process for the recovery of valuable components from ores, comprising reacting the ore with a mixture of a silico-fluoride and a fluoride, leaching the reaction product and treating with alkali, separating the insoluble oxide resulting, and returning the alkaline fluoride, after suitable dehydration, to the first step of the process.

11. A process for the recovery of beryllium values from its ores, comprising reacting the ore with a mixture of a silico-fluoride and a fluoride, leaching the reaction product and treating with alkali, separating the beryllium-oxide, and returning the alkaline fluoride, after suitable dehydration, to the first step of the process.

12. A process for the recovery of beryllium values from its ores which comprises reacting the ore with a mixture of a silicofluoride and a fluoride in approximately the proportions of 30 parts of the ore, 19 parts of the silico-fluoride and 4 parts of the fluoride, leaching the reaction product and treating with alkali, and separating the beryllium oxide.

13. The process of separating a metallic oxide from its ore which comprises reacting an oxygen-containing ore with a silicofluoride and a fluoride.

14. The process of separating a metallic oxide from its ore which comprises reacting an oxygen-containing ore with an alkaline silicofluoride and a fluoride.

15. The process of separating a metallic oxide from its ore which comprises reacting an oxygen-containing ore with an alkaline silicofluoride and an alkaline fluoride.

16. The process of reacting an oxygen containing ore to secure a compound of the metal of the ore which comprises reacting the ore with a silico-fluoride and a fluoride in the presence of heat.

17. The process of reacting an oxygen containing ore to secure a compound of the metal of the ore which comprises reacting the ore with a silico-fluoride and a sodium fluoride in the presence of heat.

18. The process of reacting an oxygen containing ore to secure a compound of the metal of the ore which comprises reacting the ore with a silico-fluoride and an alkaline fluoride in the presence of heat.

19. The process of reacting an oxygen containing ore to secure a compound of the metal of the ore which comprises reacting the ore with an alkaline silico-fluoride and a fluoride in the presence of heat.

20. The process of reacting beryl which comprises reacting the ore with sodium silico-fluoride and sodium fluoride in approximately the following proportions: 30 parts of beryl, 19 parts of sodium silico-fluoride and 4 parts of sodium-fluoride.

21. The process which comprises reacting beryl with sodium silico-fluoride and sodium fluoride, reacting the resulting sodium beryllium fluoride with sodium hydroxide and employing the sodium fluoride thus produced for the first reaction.

HARRY C. CLAFLIN.